Figure 1:
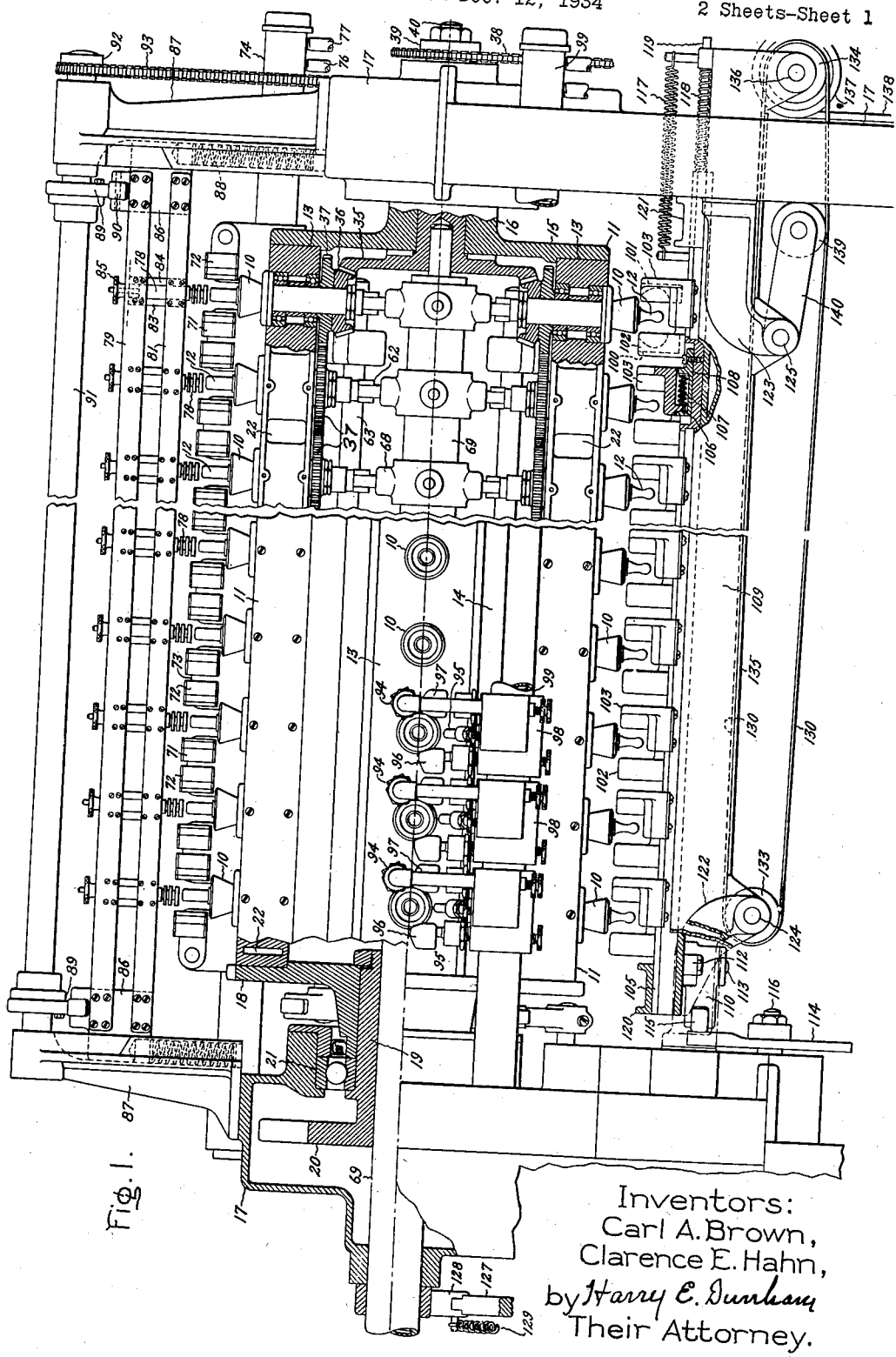

Nov. 10, 1936.  C. A. BROWN ET AL  2,060,659
MACHINE FOR BLOWING BULBS
Filed Dec. 12, 1934  2 Sheets-Sheet 2
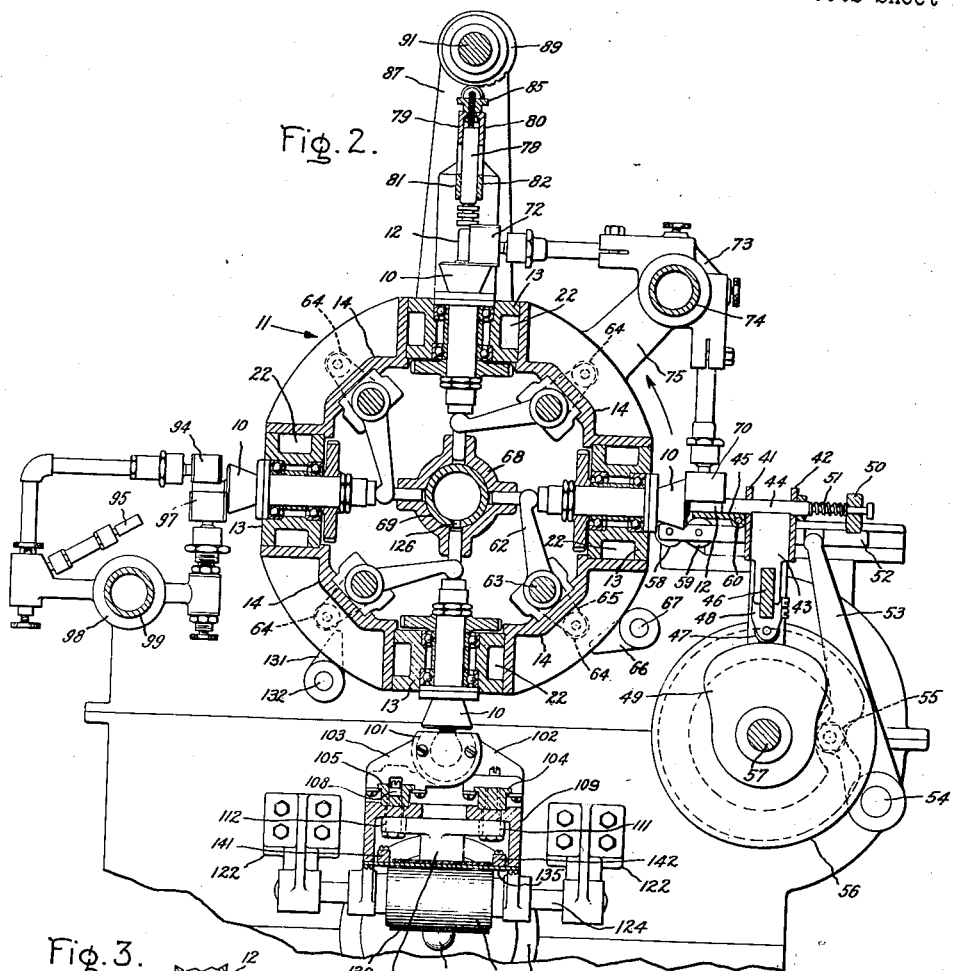
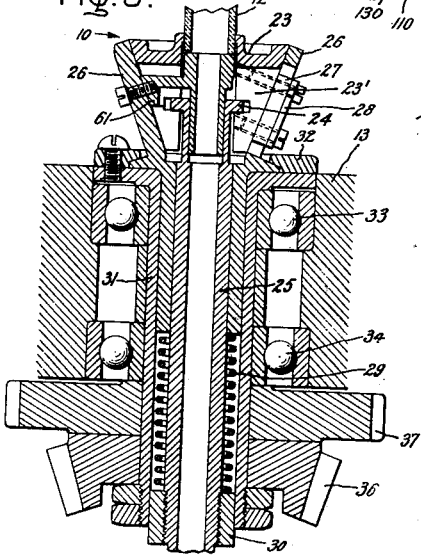
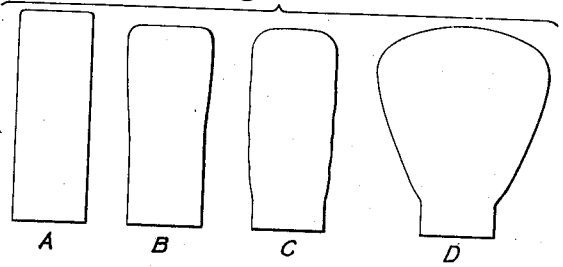
Inventors:
Carl A. Brown,
Clarence E. Hahn,
by Harry E. Dunham
Their Attorney.

Patented Nov. 10, 1936

2,060,659

UNITED STATES PATENT OFFICE 2,060,659

MACHINE FOR BLOWING BULBS

Carl A. Brown, Chardon, and Clarence E. Hahn, Cleveland Heights, Ohio, assignors to General Electric Company, a corporation of New York Application December 12, 1934, Serial No. 757,158

11 Claims. (Cl. 49—7)

Our invention relates to machines for re-shaping vitreous bodies and more particularly to machines for blowing lamp bulbs or the like from preformed vitreous blanks. Our machine provides a turret rotatably mounted on a horizontal axis and having a plurality of heads or chucks thereabout much the same as shown in our co-pending application Serial No. 691,480 filed September 29, 1933, which forms the solid lens-end type bulb. The present application is in part a continuation of the said co-pending application. Our machine preferably uses a preformed vitreous blank, tubular in shape, with one end closed off and heats, upsets and blows said end into a bulb, whereas the other machine only heats, upsets and forms one end of a length of tubing. The use of preformed blanks eliminates all waste formerly experienced with the end to end method of making the bulbs from a length of tubing. In such cases, when the tubing was sealed shut to form the end of the bulb, the neck of the adjoining bulb was also closed off so that the neck had either to be reformed or the distorted portion cut off.

Our machine is particularly adapted to high speed, large quantity production which is achieved through use of a horizontally mounted turret with a large number of heads. Our machine is also featured by a structure which permits practically all of the blank to be heated and reshaped in any way desired. Other features and advantages of our invention will be apparent from the detailed description which follows and from the accompanying drawings.

In the drawings, Fig. 1 is a side elevation partially in section of the machine of our invention; Fig. 2 is a vertical section therethrough; Fig. 3 is a section through one head of the turret on an enlarged scale; and Fig. 4 shows the various steps in manufacturing one type of lamp bulb on our machine.

In general, our machine, as shown in Figs. 1 and 2, consists of four series of heads or chucks 10 mounted 90° apart on the horizontally mounted turret 11. Each series of heads passes from a loading position, shown on the right in Fig. 2, in which the vitreous blanks 12 are placed into the head and are heated, to a heating and upsetting position. A heating position follows the setting position and then another index of the turret places the blank between halves of a mold. The mold closes immediately on the blank which is then blown out thereagainst. The bulb formed is released by the turret head after the mold is opened, causing it to fall onto a moving belt to be carried away to an annealing furnace not shown.

Now in detail, the machine turret 11 is composed of four rectangular blocks 13, in each of which one longitudinal row or series of radially mounted holders or heads 10 is located, which are attached to four angular supporting members 14 located therebetween. One end of the blocks 13 and supporting members 14 is attached to the flange 15 of the spindle 16 which is rotatably mounted in an adjacent portion of the frame 17, and the other end thereof is attached to the flange 18 mounted on the hub 19 of the Geneva gear 20 which is mounted in the adjacent portion of the frame 17. The frame and the mechanism therein which indexes the turret and operates other portions of the machine correspond to that shown in connection with the lens-end bulb machine shown in the application hereinbefore referred to. The hub 19 of the Geneva gear 20 is mounted in ball bearing 21 which is held by the frame 17 and is indexed by mechanism not shown. The blocks 13 are provided with passages 22 therein which permit cooling water, which enters and discharges through the spindle 16 as with the other machine, to pass along one side of the heads and back along the other.

Each of the turret heads 10, as shown in Fig. 3, comprises a washer 23 which is divided into a plurality of sections each of which is provided with an inwardly extending portion 23' which engages the flange 24 on the end of the tubular spindle 25. Longitudinal movement of the spindle creates a similar movement in the washer sections which are caused to move in by direct engagement with the cup 26 and are caused to move out through engagement of a block 27 on each of the sections with said cup. The blocks 27 lie within slots in cup 26 which they engage through flanges 28. With a closed head the washer sections are drawn in due to the pressure exerted by spring 29 which is located between the end of the cup 26 and a nut 30 attached to spindle 25. The whole is mounted in sleeve 31 which is attached to cup 26 by ring 32 and rides on ball bearings 33 and 34 in the block 13. In order that all parts of the blank may be treated, the head assembly supporting it is constantly kept rotating. This motion is produced through a driving bevel gear 35 (Fig. 1) which engages driven bevel gears 36 on the sleeves 31 of each of the end heads at one end of each series. The heads in each of the series are caused to rotate about their axes by a gear 37 on sleeve 31 of each head which meshes with the gears 37 on the heads adjacent thereto. Gear 35 is driven from an external source through chain 38, sprocket 39 and a shaft 40 connecting therewith.

The cycle of operation begins at the turret position on the right of Fig. 2 at which blanks 12 are fed into the series of heads thereat. The feeding mechanism is a substantial duplicate of the mechanism shown in our application hereinbefore referred to and comprises a hopper in which blanks are piled with their ends against the sides 41 and 42 thereof. The blanks fall on slides 43 located before each head which at intervals is raised carrying a blank 12 into alignment with holes in the hopper sides 41 and 42 and the turret head 10. A plunger 44 is then moved to the left shoving the blank through the hole in the hopper side 41, along the groove in guide plate 45 and into the head 10. Each of the slides 43 is attached to a bar 46 which is moved vertically through engagement of roller 47 of the block 48 attached thereto with cam 49. The plungers 44 are slidably mounted in bar 50 and are caused to move therewith by the springs 51 located therebetween. The bar 50 is mounted on slides 52 at both ends of the machine which are each engaged by an end of a lever 53 which is pivoted on pin 54 extending from the frame 17 and which is operated through engagement of the roller 55 carried thereby with the ways in cam 56. Both cams 49 and 56 are mounted on cam shaft 57 which is geared to the turret by mechanism not shown. The slides 52 also carry rollers 58 and 59 which swing the guide plate 45 up into position as the plunger moves to the left. The guide plate 45 pivots about pin 60 which is supported by the hopper side 41.

The extent to which a blank enters the turret head 10 is governed by the body 61 (Fig. 3) within the cup 26 which is attached directly thereto and is apertured to permit air to pass to the blank. When the blank is fed into the head the sections forming the collar 23 are separated as the spindle 25 is pushed outward by lever 62 (Fig. 2). The levers 62 engaging each of the heads of the series are attached to a rod 63 which is rotatably mounted in one of the supporting members 14 and is turned through engagement of the roller 64 on arm 65 thereof with arm 66. Arm 66 is attached to a pin 67 extending from the frame 17 which is turned by cam mechanism not shown. The ends of the spindles 25 of corresponding heads of each series are located within apertures in a collar or sleeve 68 mounted on the tubular shaft 69 which is located on the axis of the turret. The sections of collar 23 are pulled inward to grip the blank as the pressure produced by lever 62 is released. Heating burners 70 (only one shown) are located to either side of the blank 12 and correspond to similar burners 71 and 72 (Figs. 1 and 2) located at the following position of the turret. The pairs of burners located between adjacent heads are mounted on a bracket 73 which also supports similar pairs of burners 72—71 at the second position taken by the head. Each of the brackets 73 is mounted on a manifold 74 which conducts the gas and air mixture thereto. The manifold 74 is supported by brackets extending from the frame (one bracket being shown at 75) and is connected to the gas and air supply at 76 and 77 (Fig. 1).

In indexing to the second position, the heads pass between both burners 70. At this position the blank 12 is first heated and then upset. The heating is produced by burners 71 and 72 in this particular case, but other bulb shapes and sizes require a different member and size of burner. The upsetting is done by anvils 78 which are moved downward into engagement with the ends of the blanks. Each of the upsetting anvils 78, as shown in Figs. 1 and 2, is carried in ways formed by bars 79, 80, 81 and 82 and by blocks 83 and 84 and retains a fixed position with reference thereto since a threaded stud extending from the upper end thereof is screwed into the nut 85. A groove about the nut 85 is engaged by portions of bars 79 and 80 causing said nut to hold a fixed position. The ends of the bars are fastened together at the end by plates 86—86, each of which rides in a groove in a bracket 87 extending upward from the frame and rides on a spring 88 enclosed in an aperture in the bracket. The vertical upsetting movement occurs when the plates 86 are pushed downward by cams 89 which engage the rollers 90 held by said plates. The cams 89 are mounted on shaft 91 which is supported by brackets 87—87 and is driven through sprocket 92 and chain 93 from the loading mechanism cam shaft 57.

From position 2 the heads are indexed into position 3 shown on the left of Fig. 2 in which the already somewhat plastic blank is heated further. Each blank passes into a position between burners 94, 95, 96, and 97 (Fig. 1) which are all mounted on bracket 98. The brackets 98 are mounted on manifold 99 which carries a mixture of gas and air thereto which is distributed to each of the burners through the brackets. The effect of the fires on the blank is shown at C in Fig. 4.

When the next index takes place the blanks pass into position between halves 100 and 101 of the mold which are carried by brackets 102 and 103 respectively. The brackets are mounted on bars 104 and 105, the former, 104, being fastened directly to bracket 102, and the latter, 105, having bracket 103 slidably mounted thereon. Bracket 103 is held in one position on the bar 105 by the tongue 106 thereof which lies between an end of spring 107 and the end wall of an aperture in block 108. The block lies within a longitudinal groove in bar 105 and holds the spring 107 which takes up the excessive movement thereof after the halves of the mold come together. The mold halves are brought together through movement of bars 104 and 105 which are slidably mounted on the channel 109 and which are engaged by lever 110 through rollers 111 and 112 respectively. The lever 110 pivots on a pin 113 extending from the channel 109 and is operated by cam 114 through engagement of a roller 115 in an arm of said lever therewith. Cam 114 is mounted on shaft 116 which is turned in proper time relation to the rotation of the turret by mechanism not shown. Bar 104 is pulled, so that roller 111 thereon engages lever 110, by spring 117 which extends between posts in channel 109 and the bar; and bar 105 is pushed, so that roller 112 engages said lever, by spring 118 which is located around rod 119 and butts against the end of the bar and a portion of channel 109. Brackets 120 and 121 prevent the bars 104 and 105 from moving from their ways in the channel which is supported through pairs of brackets 122 and 123 at both ends of the machine which hold shafts 124 and 125 which the channel engages. In some cases it has been found desirable to cool the molds. This is done by passing water through passages in the mold holding brackets 102 and 103 from manifolds mounted adjacent thereto and connected to the brackets through flexible hose.

After the molds have closed, air is blown into the blank through the head expanding said blank to the shape of the mold. The air passes to the blank through the tubular spindle 25 from the passage in collar 68 in which the end of said spindle is located. The air is preferably blown in puffs which are created by a partial rotation of tubular shaft 69 in both directions which carries the hole 126 in said shaft into and out of alignment with the passage in collar 68 in which the spindle is located. One end of the tubular shaft 69 is plugged and is provided for support with a stud which is rotatably mounted in gear 35, whereas the other end of the shaft passes through its supporting means and is connected to a supply of air. The air is introduced into the shaft in sufficient quantity to keep the pressure therein substantially constant. Rotation of the shaft 69 is produced by a cam (not shown) of the machine which engages the bar 127 extending from the arm 128 on said shaft. Spring 129 keeps the bar in engagement with the cam. After the bulb is blown, the mold is separated and the bulb is released from the head which causes it to fall onto the moving belt 130 below. The release of the bulb is brought about by engagement of arm 131 with the roller 64 of the release mechanism of this series of heads. Arm 131 is attached to pin 132 which is turned by mechanism (not shown) within a portion of the frame. The belt 130 rides on rollers 133 and 134 and its carrying surface is supported by plate 135 which is attached to the channel 109. Roller 133 is mounted on shaft 124, and roller 134 is mounted on shaft 136 which is mounted in the channel 109 and is driven through pulley 137 and belt 138. Slack in the belt 130 is taken up by the idler roller 139 which is mounted on arm 140 swinging from shaft 125. Guide bars 141 and 142 prevent the bulb from passing off the side of the belt.

What we claim as new and desire to secure by Letters Patent of the United States is:

1. In a device of the class described, a turret mounted on a substantially horizontal axis, a plurality of longitudinal rows of holders for vitreous blanks radially mounted on said turret, means for indexing said turret intermittently about said horizontal axis, a plurality of heating and shaping means disposed adjacent the paths of travel of said holders, and means for automatically opening said holders periodically to discharge the shaped vitreous articles.

2. In a device of the class described, a turret rotatably mounted on a substantially horizontal axis, a plurality of longitudinal rows of radially mounted holders for vitreous blanks on said turret, means for rotating said holders about their axes, means for indexing said turret intermittently about its horizontal axis, means adjacent a horizontal position of a row of holders for feeding blanks thereto, heating means adjacent the path of travel of said holders for rendering the ends of said blanks workable, and means also adjacent the path of travel of said holders for shaping the said heated ends of said blanks.

3. In a device of the type described, a turret comprising an elongated drum rotatably mounted on a substantially horizontal axis, a plurality of longitudinal rows of radially disposed holders for vitreous blanks mounted on said drum, intermeshing gears on the holders in each of said rows, a driven gear on each of the holders at one end of the drum, a driving gear at said end of said drum engaging the said driven gears for rotating the holders about their axes, means for indexing said drum intermittently about said horizontal axis, a plurality of burners and shaping means disposed adjacent the paths of travel of said holders, and mechanisms for automatically opening said holders periodically to discharge the shaped vitreous articles.

4. In a device of the class described, the combination of a turret comprising an elongated drum rotatably mounted on a substantially horizontal axis, a plurality of longitudinal rows of radially disposed holders for vitreous blanks mounted on said drum, intermeshing gears on the holders in each of said rows for rotating said holders about their axes, means for indexing said holders about their axes, means for indexing said drum intermittently about said horizontal axis, a hopper for vitreous blanks adjacent a horizontal position of a row of holders, a plurality of plungers mounted on said hopper in line with the holders at said horizontal position, means for moving said plungers toward said holders to feed blanks thereto, burners adjacent the path of travel of said holders for rendering the ends of said blanks workable, and shaping mechanisms adjacent the path of travel of said holders for shaping the said heated ends of said blanks.

5. A machine for blowing vitreous articles comprising a turret rotatably mounted on a horizontal axis, a plurality of heads located about the periphery of said turret and extending outward therefrom adapted to hold vitreous blanks, said heads being located in a plurality of series arranged parallel to the axis of the turret, means for causing rotation of said heads, heating means for said blanks disposed in the path of travel of said heads as the turret is rotated, separable molds located adjacent said path of travel of the heads, means for separating and again uniting said molds in proper time relation to the rotation of the turret to permit insertion of the heated blanks into the molds, means for blowing air into said blanks through said heads to cause the blanks to expand to the interior form of said molds and means for opening said heads after the molds have again separated to release the articles blown from the blanks.

6. A machine for blowing vitreous articles comprising a turret rotatably mounted on a horizontal axis, a plurality of heads located about the periphery of said turret and extending outward therefrom adapted to hold vitreous blanks, said heads being located in a plurality of series arranged parallel to the axis of the turret, means for causing rotation of said heads, means located in the path of travel of the heads for feeding blanks into each head of one series thereof at one position of the turret, means located also in said path for heating the blanks carried by said series of heads, a plurality of upsetting anvils located adjacent said heads at the heating position, means for moving said upsetting anvils into engagement with the outward ends of the blanks to upset them, other heating means located at a following position of said series of heads for giving additional heat to said blanks, a plurality of separable molds located opposite said series of heads when in a predetermined position, means for separating and uniting said molds in proper time relation to the rotation of the turret to permit insertion of a heated blank into each of the molds, means for blowing air into said blanks to cause them to expand to the interior form of the molds and means for opening said series of heads after the molds have again separated to release the article blown from the blanks.

7. A machine for blowing vitreous articles comprising a turret rotatably mounted on a substantially horizontal axis, a plurality of heads radially mounted about the periphery of said turret and adapted to hold vitreous blanks, means for causing the rotation of said heads about their axes, means for indexing said turret intermittently, a hopper at the horizontal position of a head, means for feeding blanks from said hopper to a head at said horizontal position, heating means for said blanks disposed in the path of travel of said heads as the turret is rotated, an upsetting anvil disposed in said path above said turret, means for moving said anvil radially downward toward the turret thereby causing it to strike the end of a vitreous blank carried by a head to upset it, a separable mold located adjacent the path of travel of said heads and below said turret, means for separating and again uniting said mold in proper time relation to the rotation of the turret to permit insertion of the heated blank into the mold, means for blowing air into said blank through said head to cause the blank to expand to the interior form of said mold and means for opening said heads after the mold has again separated to release the article blown from the blank.

8. A machine for blowing vitreous articles comprising a turret rotatably mounted on a substantially horizontal axis, a plurality of longitudinal rows of heads radially mounted about the periphery of said turret and adapted to hold vitreous blanks, means for causing the rotation of said heads about their axes, means for indexing said turret intermittently, a hopper at the horizontal position of a row of heads, means for feeding blanks from said hopper to a row of heads at said horizontal position, heating means for said blanks disposed in the path of travel of said heads as the turret is rotated, a longitudinal row of upsetting anvils disposed in said path above said turret, means for moving said upsetting anvils radially downward toward the turret thereby causing them to strike the ends of vitreous blanks carried by a row of heads to upset them, a longitudinal row of separable molds located adjacent the path of travel of said heads and below said turret, means for separating and again uniting said molds in proper time relation to the rotation of the turret to permit insertion of the heated blanks into the molds, means for blowing air into said blanks through said heads to cause the blanks to expand to the interior form of said molds and means for opening said heads after the molds have again separated to release the articles blown from the blanks.

9. In a device of the class described, a turret comprising an elongated drum rotatably mounted on a substantially horizontal tube, a plurality of longitudinal rows of heads radially mounted on said turret and having apertures extending therethrough, said heads being adapted to hold vitreous blanks with the said apertures therein communicating with the interior of said blanks, an elongated sleeve mounted on said tube and havng rows of apertures therein communicating with the apertures in said heads, said sleeve being adapted to rotate on said tube with said turret, means disposed in the paths of travel of said heads for heating and shaping said blanks, and a row of apertures in said tube located in the paths of travel of the apertures in said sleeve whereby when a row of apertures in said sleeve is aligned with the said row of apertures in said tube air under pressure is introduced in the blanks held in a row of heads from said tube through the apertures therein and through the aligned apertures in said sleeve and row of heads.

10. In a device of the class described, a turret comprising an elongated drum rotatably mounted on a substantially horizontal tube, a plurality of longitudinal rows of chucks radially mounted on said turret and having axial apertures therethrough, said chucks being adapted to hold vitreous blanks in their outer ends with the said apertures therein communicating with the interior of said blanks, an elongated sleeve mounted on said tube and having rows of apertures therein, the inner ends of each of said rows of chucks being disposed in a row of apertures in said sleeve whereby said sleeve is rotated on said tube with said turret, means disposed in the paths of travel of said chucks for heating and shaping said blanks, and a row of apertures in said tube located in the paths of travel of the apertures in said sleeve whereby when a row of apertures in said sleeve is aligned with the said row of apertures in said tube air under pressure is introduced in the blanks held in a row of chucks from said tube through the apertures therein and through the aligned apertures in said sleeve and row of chucks.

11. In a device of the class described, the combination of a turret comprising an elongated drum rotatably mounted on a substantially horizontal axis, a plurality of longitudinal rows of radially disposed holders for vitreous blanks mounted on said drum, intermeshing gears on the holders in each of said rows for rotating said holders about their axes, means for indexing said drum intermittently about said horizontal axis, a hopper for vitreous blanks adjacent a horizontal position of a row of holders, a plurality of plungers mounted on said hopper in line with the holders at said horizontal position, means for moving said plungers toward said holders to feed blanks thereto, burners adjacent the path of travel of said holders for rendering the ends of said blanks workable, a longitudinal row of upsetting anvils disposed adjacent said path of travel of said holders above said turret, means for moving said anvils radially downward toward the turret thereby causing them to strike the ends of the vitreous blanks carried by a row of holders to upset them, a longitudinal row of separable molds located adjacent the path of travel of said holders and below said turret, a cam for causing said molds to be separated and again united in proper time relation to the rotation of the turret to permit insertion of the heated blanks into the molds and means for blowing air into said blanks through said heads to cause the blanks to expand to the interior form of said molds.

CARL A. BROWN.
CLARENCE E. HAHN.